Patented Nov. 14, 1950

2,529,521

UNITED STATES PATENT OFFICE 2,529,521

TRISUBSTITUTED ACETIC ACIDS

Nathan Sperber, Bronx, and Domenick Papa, Brooklyn, N. Y., assignors to Schering Corporation, Bloomfield, N. J., a corporation of New Jersey No Drawing. Application July 1, 1946, Serial No. 680,850

8 Claims. (Cl. 260—540)

This invention relates to a new method for the production of trisubstituted acetic acids and to certain new and useful trialkyl acetic acids obtainable thereby.

A general method for the production of substituted acetic acids involves the hydrolysis of the corresponding substituted acetamides according to the equation

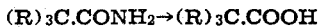

$$(R)_3C.CONH_2 \rightarrow (R)_3C.COOH$$

Hydrolysis of substituted acetamides to the corresponding acids has been effected by treatment with inorganic acids such as hydrochloric, sulfuric and phosphoric acids of various strengths and at temperatures ranging from room temperature to about 150° C. and with alkalies such as potassium and sodium hydroxide in solvents such as water, alcohol, ethylene glycol and glycerine at temperatures ranging from 25° to 250° C. Conversion of substituted acetamides into the corresponding acetic acids has also been effected by treating the acetamides with sodium nitrite in the presence of inorganic acids such as sulfuric and hydrochloric acids and organic acids such as acetic acid.

However, none of the methods heretofore described are generally satisfactory for the conversion of acetamides substituted with three organic radicals into the corresponding substituted acetic acids. Either very low yields are obtained, very long periods of reaction are required, or, in most cases, the known methods do not result in any conversion to the substituted acetic acids.

One of the objects of the present invention is the provision of a method for the conversion of acetamides containing three organic radicals on the alpha-carbon atom into the corresponding substituted acetic acids.

It has been found that when trisubstituted acetamides of the general formula $(R)_3C.CONH_2$, wherein the R's represent organic radicals, such as alkyl, aryl, cycloalkyl, heterocyclic or other organic radicals, are treated with a lower alkyl nitrite and a strong inorganic acid in organic solvents, a smooth and rapid conversion of the acetamides into the corresponding acetic acids in excellent yields is obtained.

In general, the substituted acetamide is dissolved in an organic solvent, such as acetic acid, benzene, or dioxane, and an alkyl nitrite, such as butyl nitrite or isoamyl nitrite, is slowly added while adding a strong inorganic acid, for example, by passing hydrogen chloride into the reaction mixture, or by adding aqueous hydrochloric acid. After the addition of the alkyl nitrite is completed, the reaction mixture may be stirred for a short time at room temperature and the trisubstituted acetic acids isolated and purified by any of the conventional methods.

The following typical examples are illustrative of the principles of the invention:

EXAMPLE I

Tributyl acetic acids (a) In a three-necked 500 cc. flask fitted with a gas inlet tube, a reflux condenser, a mechanical stirrer and a dropping funnel is placed 0.1 mol of tributyl acetamide in 100–150 cc. of glacial acetic acid. Dry HCl gas is passed into the stirred solution while 0.2 mols of freshly distilled butyl nitrite is added dropwise over a period of two hours. The solution turns deep red and becomes warm while bubbles of gas are evolved. The reaction mixture is stirred for about two hours at room temperature, and then slowly warmed on the steam bath until the red color is discharged. The solvent is removed by concentration in vacuo and the residual tributyl acetic acid purified by dis'i lation in vacuo. Yield, 85–90%, B. P.=143°/2 mm.

(b) Following the procedure outlined above but substituting benzene for the acetic acid, the tributyl acetic acid is obtained in slightly higher yield.

(c) In accordance with the procedure described under (a) tributyl acetamide is converted to tributyl acetic acid using isoamyl nitrite in place of butyl nitrite.

(d) In the procedure described under (c) when dioxane is substituted for acetic acid, the tributyl acetic acid is obtained in a yield exceeding 90%.

EXAMPLE II

Tripropyl acetic acid

Using the procedures outlined under Example I, tripropyl acetamide is converted to the tripropyl acetic acid which boils at 114–117°/5 mm.

EXAMPLE III

Diamyl butyl acetic acid

This substance is obtained from the corresponding acetamide in accordance with the procedures of Example I. It is a somewhat viscous liquid boiling at 157–160°/2.5 mm.

EXAMPLE IV

Triamyl acetic acid

Triamyl acetamide is converted by the methods described in Example I to the triamyl acetic acid boiling at 176–179°/3.5 mm.

EXAMPLE V

Diheptyl methyl acetic acid

This substance is obtained from the corresponding acetamide in accordance with the directions of Example I. The substance is a viscous liquid boiling at 169–171°/2 mm.

EXAMPLE VI

Diheptyl butyl acetic acid

Treatment of diheptyl butyl acetamide by the methods of Example I yields this trisubstituted acetic acid boiling at 179–182°/1.5 mm.

EXAMPLE VII

Phenyl dibutyl acetic acid

By treating phenyl dibutyl acetamide in accordance with the instructions of Example I, phenyl dibutyl acetic acid is obtained in yields of 80%.

EXAMPLE VIII

α(β-Diethylamino ethyl)α-cyclohexylphenyl acetic acid

Treatment of the corresponding acetamide in accordance with the instructions of Example I gives the α(β-diethylamino ethyl)α-cyclohexylphenyl acetic acid.

EXAMPLE IX

α(β-Diethylamino ethyl)α-butyl phenyl acetic acid

This acid is obtained from the corresponding acetamide by the methods described under Example I. The free acid separated as an oil which refused to solidify.

EXAMPLE X

α,α-Dibutyl-β-N-piperidino propionic acid

Proceeding as described under Example I, α,α-dibutyl-β-N-piperidino-propionamide is converted to the corresponding propionic acid in good yield. The free acid as well as the hydrochloride refuses to solidify and is identified by conversion into derivatives.

EXAMPLE XI

α,α-Dibutyl-β(diethylamino) propionic acid

Hydrolysis of α,α-dibutyl-β-diethylamino propionamide yields the corresponding acid when the reaction is carried out in accordance with the instructions of Example I.

The trisubstituted acetic acids obtainable by the method of the invention are generally useful as intermediates for the production of physiologically active substances. It has been found that trialkyl acetic acids of the general formula $$(R)_3C.COOH$$

wherein the R's represent alkyl groups containing at least three carbon atoms and the total number of carbon atoms is from 15 to 20, have useful spasmolytic properties. In general, the acids of this group show both neurotropic and musculotropic activity, although some members of the group show only the latter activity.

Typical members of this group of trialkyl acetic acids are the following:

| Name | Spasmolytic Activity | |
|---|---|---|
| | Neurotropic Atropine=100% | Musculotropic Papaverine=100% |
| | Per cent | Per cent |
| Diamyl butyl acetic acid | 0.5 | 600 |
| Triamyl acetic acid | 0.5 | 200 |
| Diheptyl butyl acetic acid | inactive | 150 |

We claim:
1. A method for the preparation of acetic acids containing three organic radical substituents on the alpha-carbon atom which comprises treating a trisubstituted acetamide of the general formula

$$(R)_3C.CONH_2$$

wherein the R's represent organic radicals selected from the group consisting of alkyl, phenyl, cyclohexyl, dimethylaminoalkyl, and piperidinoalkyl, with a lower alkyl nitrite and a strong inorganic acid in the presence of an organic solvent.

2. A method for the preparation of trialkyl acetic acids which comprises treating a trialkyl acetamide with a lower alkyl nitrite and a strong inorganic acid in the presence of an organic solvent.

3. A method for the preparation of acetic acids containing three organic radical substituents on the alpha-carbon atom which comprises treating a trisubstituted acetamide of the general formula $$(R)_3C.CONH_2$$

wherein the R's represent organic radicals selected from the group consisting of alkyl, phenyl, cyclohexyl, dimethylaminoalkyl, and piperidinoalkyl, with a lower alkyl nitrite and hydrochloric acid in the presence of an organic solvent.

4. A method for the preparation of trialkyl acetic acids which comprises treating a trialkyl acetamide with a lower alkyl nitrite and hydrochloric acid in the presence of an organic solvent.

5. A method for the preparation of acetic acids containing three organic radical substituents on the alpha-carbon atom which comprises treating a trisubstituted acetamide of the general formula $$(R)_3C.CONH_2$$

wherein the R's represent organic radicals selected from the group consisting of alkyl, phenyl, cyclohexyl, dimethylaminoalkyl, and piperidinoalkyl, with a lower alkyl nitrite and hydrochloric acid in benzene.

6. A method for the preparation of acetic acids containing three organic radical substituents on the alpha-carbon atom which comprises treating a trisubstituted acetamide of the general formula $$(R)_3C.CONH_2$$

wherein the R's represent organic radicals selected from the group consisting of alkyl, phenyl, cyclohexyl, dimethylaminoalkyl, and piperidinoalkyl, with a lower alkyl nitrite and hydrochloric acid in acetic acid.

7. A method for the preparation of acetic acids containing three organic radical substituents on the alpha-carbon atom which comprises treating a trisubstituted acetamide of the general formula $(R)_3C\cdot CONH_2$ wherein the R's represent organic radicals selected from the group consisting of alkyl, phenyl, cyclohexyl, dimethylaminoalkyl, and piperidinoalkyl, with a lower alkyl nitrite and hydrochloric acid in dioxane.

8. A method for the preparation of trialkyl acetic acids which comprises treating a trialkyl acetamide with a lower alkyl nitrite and hydrochloric acid in benzene.

NATHAN SPERBER.
DOMENICK PAPA.

REFERENCES CITED

The following references are of record in the file of this patent:

UNITED STATES PATENTS

| Number | Name | Date |
|---|---|---|
| 2,186,976 | Junkmann et al. | Jan. 16, 1940 |
| 2,429,835 | Martin et al. | Oct. 28, 1947 |

OTHER REFERENCES

Leers: Chemical Abstracts; vol. 21, page 1796 (1927).

Skrabol et al.: Physik Chem.; A183, pages 345–352 (1939).

Karrer: "Organic Chemistry"; Elsevier Pub. Co. Inc., N. Y., page 211 (1946).